Jan. 8, 1935.    F. R. MURPHY    1,987,306
APPARATUS FOR MAKING LAMINATED GLASS
Filed April 10, 1931    2 Sheets-Sheet 1

Inventor:
FRANK R. MURPHY
By Freeman and Sweet
Attys.

Jan. 8, 1935.  F. R. MURPHY  1,987,306
APPARATUS FOR MAKING LAMINATED GLASS
Filed April 10, 1931  2 Sheets-Sheet 2
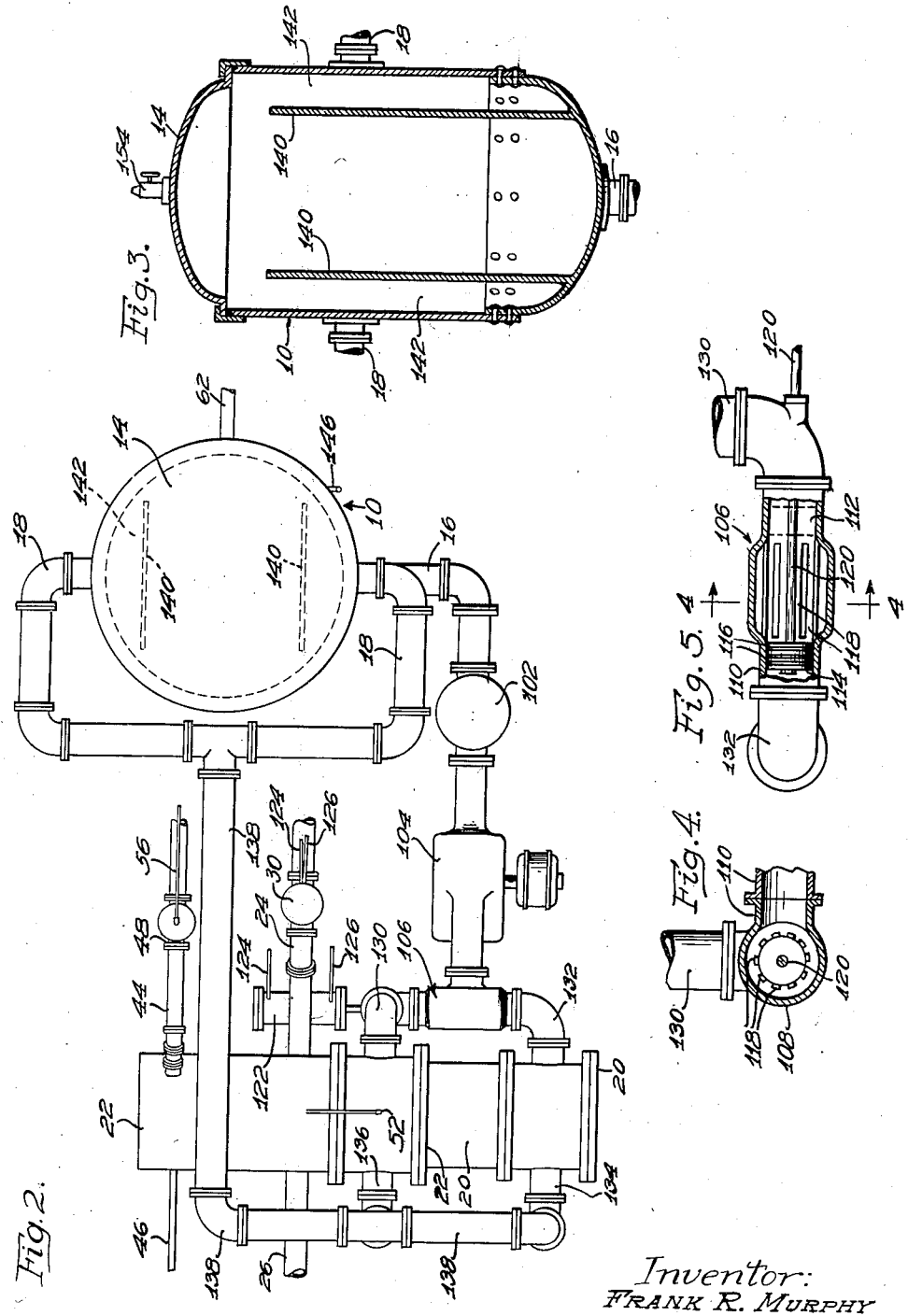
Inventor:
FRANK R. MURPHY
By Freeman and Sweet
Attys.

Patented Jan. 8, 1935

1,987,306

UNITED STATES PATENT OFFICE 1,987,306

APPARATUS FOR MAKING LAMINATED GLASS

Frank R. Murphy, Chicago, Ill., assignor to J. P. Devine Manufacturing Co. Inc., Chicago, Ill., a corporation of Illinois Application April 10, 1931, Serial No. 529,043

4 Claims. (Cl. 18—17)

My invention relates to the production of laminated glass, and includes among its objects and advantages the provision of an improved apparatus for the application of heat and pressure to the laminated glass sheets in process of manufacture.

In the accompanying drawings:

Figure 2 is a fragmentary plan view of the structure shown in Figure 1;

Figure 3 is a sectional view of a portion of the apparatus;

Figure 4 is a sectional view taken along the line 4—4 of Figure 5; and

Figure 5 is a sectional view of a valve.

Figure 1:
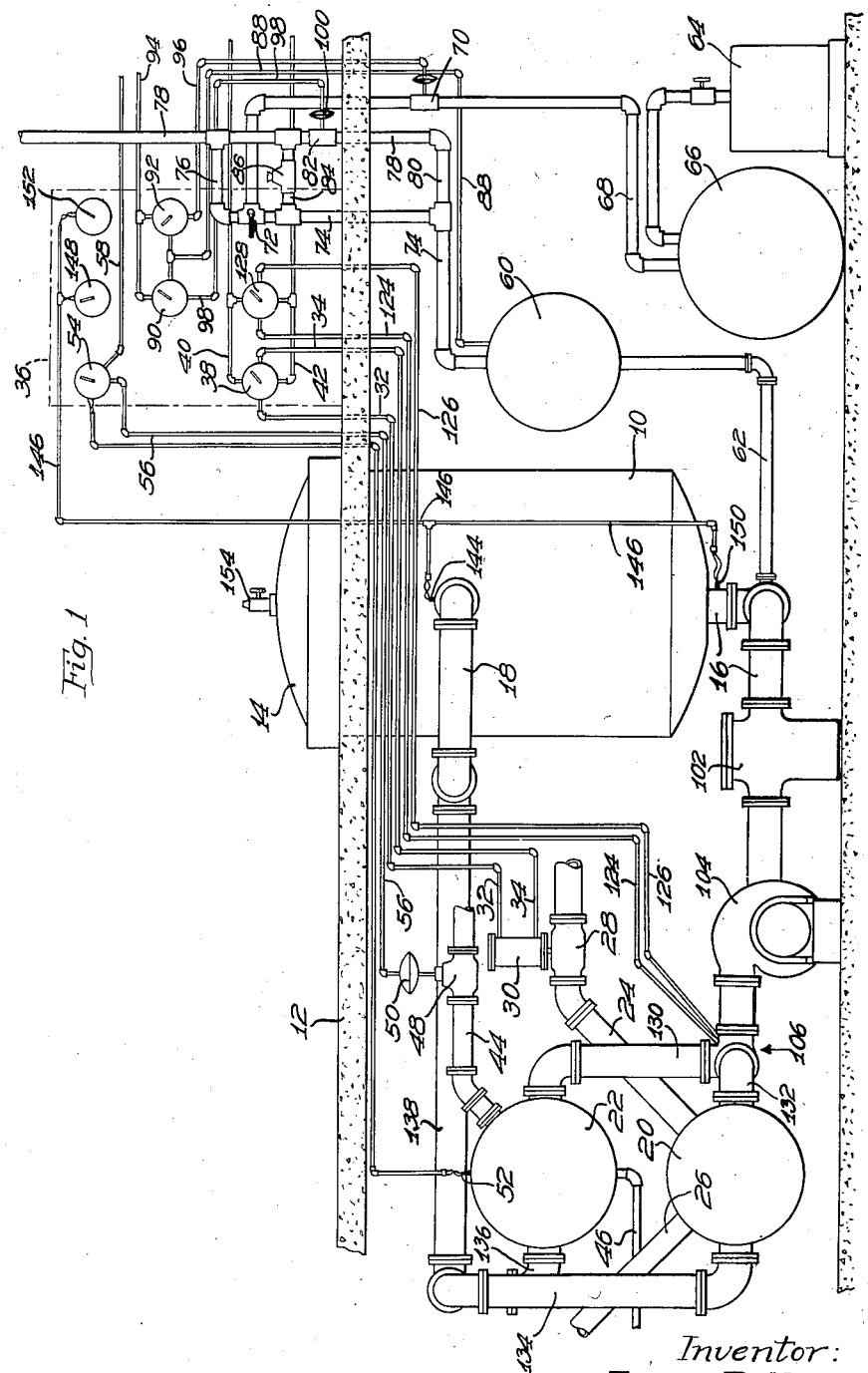
Figure 1 is a diagrammatic view illustrating an apparatus according to my invention.

The manufacture of laminated glass, as at present practiced, involves the juxtaposition of two or more layers of glass with an intervening layer or layers of pyroxylin or other gummy substances, and the union of the juxtaposed layers by the application of heat and pressure.

In the embodiment selected to illustrate the invention, I make use of a chamber 10, which is known in the art as an autoclave. The chamber has its upper end projecting above the floor 12 and is provided with a removable cover 14 to permit the insertion and removal of the material to be processed. In making laminated glass the chamber is ordinarily filled with a liquid chemical such as diethylene glycol in which the gummy substance of the glass sandwich, is slightly soluble.

To heat and cool the contents of the autoclave 10 I withdraw the contents thereof through a pipe 16 at the bottom and return the same through side inlet pipes 18 after passing the material either through a cooler 20 or a heater 22.

The heater and cooler both operate by indirect heat exchange. The cooler is cooled by cooling water delivered through pipe 24 and discharged through pipe 26. The supply of cooling water through the cooler is controlled by the main valve 28, which is too large for convenient manual operation, and is operated by an operating cylinder 30 to which pressure fluid may be delivered at either end through pipes 32 and 34 with simultaneous discharge through the other pipe. The operation of the main valve 28 may be controlled by an operator positioned at the panel board 36 by means of the manual valve 38 connected with a source of pressure fluid 40 and a discharge pipe 42.

The heater is provided with an intake pipe 44 for steam and a discharge pipe 46 for condensate. The intake pipe is controlled by a valve 48 operated by a diaphragm 50.

Thermostatic means are provided for controlling the operation of the valve 48. A temperature sensitive device indicated at 52 is associated with the heater and subjected to the temperature of the fluid leaving the heater. This temperature responsive device is connected with the automatic control valve 54 which includes a threeway valve adapted to connect the pipe 56 leading to the diaphragm 50, either with a supply pipe 58 connected to a source of compressed air, or to the atmosphere. In this way the temperature of the heated fluid leaving the heater may be controlled within narrow limits.

The auxiliary tank 60 is tapped into the system at 62, and provides a capacity such that, to accommodate the thermal expansion when the contents of the autoclave and part of the rest of the system become heated, part of the fluid may move out of the system proper into the auxiliary tank.

To provide accurate pressure control, I have illustrated an air compressor 64 maintaining a pressure of 300 pounds per square inch in the storage tank 66 and automatic pressure sensitive connections for maintaining a substantially constant pressure in the auxiliary tank 60 independent of expansion and contraction.

From the storage tank 66 the supply pipe 68 leads through the diaphragm control valve 70 to a manually operated threeway valve 72 located on the panel board 36. The threeway valve 72 may be operated to connect the supply pipe to the auxiliary tank through a pipe 74 or to disconnect the supply pipe completely and connect the auxiliary tank to atmosphere through pipes 76 and 78. When the threeway valve 72 is in position to deliver pressure to the auxiliary tank, two escapes to atmosphere from the auxiliary tank are provided, one through pipes 80 and 78 including a diaphragm control valve 82, and another through a cross pipe 84 containing an emergency release valve 86. Either the diaphragm control valve 82 or the emergency release valve 86, when opened, will connect the auxiliary tank direct with atmosphere.

When the auxiliary tank is connected to pressure by means of the threeway valve 72, the diaphragm control valve 70 operates to prevent the pressure delivered from the storage tank exceeding 250 pounds. A pressure tap 88 extends from the auxiliary tank to each of two pressure sensitive regulators 90 and 92. The regulator 92 on the right is adjusted so that whenever the pressure in the tap exceeds 250 pounds, operating pressure fluid delivered through the pipe 94 will be delivered down through the pipe 96 to the diaphragm control valve 70 and close the valve.

When the fluid is being heated, and therefore expanding, the control valve 70 cannot prevent rise in pressure, which must be prevented by letting compressed air out of the system. For this purpose the pressure regulator 90 on the left is adjusted so that whenever the pressure in the auxiliary tank exceeds 252 pounds, operating pressure fluid from the pipe 94 will be delivered through the pipe 98 to the diaphragm 100 and open the control valve 82, releasing the compressed air in the auxiliary tank 60 direct to atmosphere. As a measure of safety, it is noted that if the release valve 82 fails to operate, the emergency release valve 86 is connected in parallel with it and will operate at a higher pressure, such as 290 pounds, to vent the system before the pressure exceeds the danger point.

In heating or cooling the fluid, it is withdrawn through the bottom pipe 16 and passed through a strainer 102 and a centrifugal pump 104, from which it is delivered either to the heater 22 or the cooler 20 under the control of a reversing valve 106 illustrated in detail in Figures 4 and 5. This valve comprises an enlarged central portion 108 into which the discharge from the pump 104 is delivered and two necks 110 and 112 axially aligned therewith. An ordinary piston 114 of the type provided with a plurality of ordinary piston rings 116 may be positioned in either the neck 110 or the neck 112, leaving the other neck open to constitute the outlet. The cylinder defined by the necks 110 and 112 is continued in spider form across the enlargement 108 by a plurality of ribs 118 which afford guidance for the piston and hold the piston rings in place when the piston moves from one neck into the other. It is possible to design the body of the piston with ample clearance in the necks 110 and 112, so that the extreme temperature changes through which the parts are subjected will not by any possibility cause the parts to seize, and still to secure an effectively tight seal for the valve.

The piston 114 is operated by a piston rod 120 actuated by an actuating cylinder 122 connected through pipes 124 and 126 with the control valve 128 on the panel board 36 by means of which either of the pipes leading to the actuating cylinder 122 may be connected to the source of pressure fluid 40 and the other pipe simultaneously connected to the discharge pipe 42.

From one end of the reversing valve 106 a pipe 130 leads to the heater 22, and from the other end a pipe 132 leads through the cooler 20. A pipe 134 from the cooler 20 and a pipe 136 from the heater 22 rise to join a common return pipe 138, returning the treated fluid to the inlet pipes 18 at the side of the chamber 10.

In changing the temperature inside of the container 10, it is desirable to have the temperature change proceed gradually and uniformly from one end of the chamber to the other, in such a way as to avoid local differences in temperature that might impair the quality of the product. I have indicated baffles 140 separating the central or main portion of the chamber 10 from segmental inlet chambers 142 at either side of the autoclave. The medium coming in at the new temperature enters these chambers 142 through the pipes 18 and overflows them at the top, so that the mass of fluid in the central portion where the material under treatment is located, moves downwardly slowly and without turbulence.

I have provided means for observing the temperatures at the inlet and at the outlet of the autoclave at all times. The temperature sensitive element 144 is a copper-constantan thermocouple, and has its wires running through piping 146 to a temperature indicator 148 on the panel board 36, and another similar element 150 located in the outlet pipe 16 has its wires connected in part through the same piping 146 to a companion indicator 152 on the panel board.

In operating the apparatus disclosed, we will start with the cover removed, and the charge of fluid cooled to about 170° F., a temperature that will not subject the glass to too rapid heating when it is placed in the autoclave. At this time the level of the liquid in the system is preferably just below the floor 12, i. e., below the top of the autoclave and below the controlled release valve 82.

The glass is now charged into the autoclave. The cover 14 is put in place and tightly sealed. To get rid of the air in the top of the autoclave, an air release valve 154 in the top of the cover is manually opened and the threeway valve 72 is gently opened part way to deliver a moderate pressure. As soon as liquid is expelled from the valve 154, the valve may be closed and the system will be completely charged with fluid throughout, except for the upper portion of the auxiliary tank 60, to which the full pressure permitted by the diaphragm control valve 70 is now delivered by throwing the threeway valve 72 wide open.

The reversing valve 106 is now positioned to pass the liquid circulated by the pump 104 through the heater 22, and the temperature rises to 240° F. and is maintained at that temperature for six minutes.

During the heating, the thermal expansion of the fluid will expel a considerable amount of it into the auxiliary tank 60. The initial movement into the auxiliary tank 60 will raise the pressure of the air above the fluid. This would tend to run the pressure up to a dangerous degree, if it were not for the controlled release valve 82 which will open at a pressure only slightly higher than that for the valve 70, and relieve the excess pressure as fast as it accumulates.

After the charge has been treated for six minutes at 240° F. the reversing valve 106 is thrown into position to pass the fluid through the cooler 20 and the temperature is brought down again to 170° F.

During this cooling the thermal contraction of the fluid would permit the pressure to drop, and this drop in pressure might injure the product, especially by forming bubbles in between the laminations of the glass. This is prevented by the closure of the controlled release valve 82 as soon as the pressure goes below 252 pounds, and by the opening of the controlled supply valve 70 whenever the pressure goes below 250 pounds to supply additional compressed air.

After the fluid in the system has been cooled to 170° F. the threeway valve 72 may be thrown over manually to disconnect the source of compressed air and connect the auxiliary tank to atmosphere. This releases all pressure in the system so that the cover 14 may be immediately removed for taking out the charge of processed material and inserting a new charge to start another cycle identical with the first one.

The pump 104 may run continuously without attention from the operator, and need only be shut down when the entire system is not in use.

Without further elaboration, the foregoing will so fully explain my invention that others may, by applying current knowledge, readily adapt the same for use under various conditions of service.

I claim:

1. Laminated glass-making apparatus comprising a chamber for containing sheets of glass, a fluid-containing system in which said chamber is included, means for applying a predetermined pressure to the liquid in the system, operator-controlled means for varying the temperature of the liquid in the system, and compensating means associated with said pressure-applying means for accommodating expansion and contraction of said fluid, said compensating means including an overflow container normally only partly filled with liquid and of sufficient capacity to accommodate the maximum expansion and contraction occurring, a source of gas under pressure, a connection from said source for delivering compressed gas to said overflow receiver whenever the pressure drops below a first predetermined value, a valve controlled vent from said overflow receiver to atmosphere, automatic control means for said valve to vent said receiver whenever the pressure rises above a second predetermind value, means establishing a second venting connection for said receiver, a relief valve in said second venting connection for venting said receiver when the pressure rises to a third predetermined value, and manual means for connecting said receiver to said source of pressure or for disconnecting said receiver from said source of pressure and venting it independently of any other vent-control means, said second predetermined pressure being only slightly higher than said first predetermined pressure and establishing a narrow range of pressure control, whereby during expansion on heating said second predetermined pressure is maintained throughout the heating, and during contraction on cooling said first predetermined pressure is maintained during cooling, said third predetermined pressure representing the limit of safety for the apparatus in case the automatic means for maintaining said second predetermined pressure should fail to operate.

2. Laminated glass-making apparatus comprising a liquid circulating system including a chamber for receiving sheets of glass, and means for putting said liquid through a predetermined temperature and pressure cycle to treat the glass, said cycle beginning first at low temperature and atmospheric pressure, followed by moderate pressure and the expulsion of air from the system, followed second by predetermined high pressure automatically maintained and rising temperature, followed third by constant high temperature and pressure, followed fourth by falling temperature and automatically maintained high pressure, followed fifth by reduction of pressure to atmospheric to reach the original temperature and pressure condition and to permit opening the chamber to withdraw a treated charge of material and insert a new charge, said means including a continuously operating circulating means, a manually controlled cooler, an automatically controlled heater, manual control means for including either said cooler or said heater in the circulation, an overflow receiver, automatic controlled pressure supply and venting means for maintaining a predetermined high pressure in said overflow receiver and the system during said second, third, and fourth stages independent of expansion and contraction during heating and cooling, and manually controlled means for interrupting the effective connection between said automatic control means and said receiver and connecting said receiver to atmosphere.

3. A laminated glass-making apparatus including a system of connecting receptacles, said receptacles including an autoclave and an expansion tank, said system being charged with a constant mass of non-volatile fluid, a source of gaseous pressure, automatic pressure-sensitive means, continuously operative when connected, for delivering gas from said pressure source to said expansion tank whenever the pressure falls below a predetermined value, automatic pressure-sensitive means, continuously operative when connected, for venting gas from said tank to atmosphere whenever the pressure exceeds a predetermined value slightly greater than said first predetermined value, and manual operator-controlled means for disconnecting both said automatic pressure-sensitive means from said expansion tank and connecting said expansion tank with atmospheric pressure.

4. Apparatus for making laminated glass comprising an autoclave and an overflow or expansion tank connected thereto, means for heating and cooling the liquid contents of the autoclave, and automatic means operating by delivery of compressed gas to the expansion tank for controlling the pressure during changes in temperature, said pressure control means including an automatic pressure-sensitive relief valve for letting compressed gas out of the expansion chamber during heating, and an automatic pressure-sensitive supply valve for delivering compressed gas into the expansion chamber during cooling.

FRANK R. MURPHY.